United States Patent [19]

Rough, Sr. et al.

[11] 4,303,434
[45] Dec. 1, 1981

[54] METHOD AND APPARATUS FOR PREHEATING PULVEROUS MATERIALS PRIOR TO THEIR INTRODUCTION INTO A MELTING FURNACE

[75] Inventors: Robert R. Rough, Sr., Toledo; Duane C. Nugent, Perrysburg, both of Ohio

[73] Assignee: Owens-Illinois, Inc., Toledo, Ohio

[21] Appl. No.: 215,478

[22] Filed: Dec. 11, 1980

Related U.S. Application Data

[63] Continuation-in-part of Ser. No. 185,117, Sep. 8, 1980, abandoned.

[51] Int. Cl.³ .............................................. C03B 3/00
[52] U.S. Cl. ......................................... 65/27; 65/134; 65/335; 165/3; 165/111; 165/112; 165/104.18
[58] Field of Search ........................... 65/335, 27, 134; 165/104 M, 111, 112, 3

[56] References Cited

U.S. PATENT DOCUMENTS

| | | | |
|---|---|---|---|
| 2,911,198 | 11/1959 | Karlsson | 165/111 X |
| 3,274,752 | 9/1966 | Huyghe et al. | 165/104 M |
| 3,880,639 | 4/1975 | Bodner et al. | 65/134 |
| 4,184,861 | 1/1980 | Erickson et al. | 65/27 |
| 4,248,616 | 2/1981 | Seng et al. | 65/335 |

*Primary Examiner*—Arthur D. Kellogg
*Attorney, Agent, or Firm*—E. J. Holler; M. E. Click; D. H. Wilson

[57] ABSTRACT

The present invention relates to method and apparatus for preheating pulverous materials, such as glass batch constituents, prior to their introduction into a melting furnace to increase the efficiency and output of the melting installation. The pulverous materials are passed downwardly through a shell and tube preheater with super-atmospheric gas pressure over the pulverous material to force the contained moisture downwardly to be vented from a lower region of the preheater. The increased gas pressure prevents moisture condensation and build-up on the pulverous material within the tubes, especially in cooler areas, which can cause tube pluggage. The subject invention is of particular utility to the glass industry and especially glass melting furnaces, but is also applicable to other types of furnaces.

35 Claims, 4 Drawing Figures

METHOD AND APPARATUS FOR PREHEATING PULVEROUS MATERIALS PRIOR TO THEIR INTRODUCTION INTO A MELTING FURNACE

CROSS-REFERENCE TO RELATED APPLICATION

This application is a continuation-in-part application of pending U.S. patent application Ser. No. 185,117, filed Sept. 8, 1980, in the name of the same inventor and having the same title, which application is assigned to the same common assignee as the present application now abandoned.

BACKGROUND OF THE INVENTION

1. Field of the Invention

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, and especially in melting glass, the starting materials are subjected to heating only after they have been introduced into the furnace where they receive, at high temperature, the quantities of heat necessary for heating them, for ensuring completion of the endothermic reactions, and for imparting thereto sufficient fluidity to ensure homogenization and refining of the resultant molten glass mass. It has been observed in glass making that the greater part of the heat delivered to the starting materials is directed to increasing the temperature of the starting materials rather than to producing the melting reactions. In most known methods, the starting materials are deposited on top of the molten bath and are subjected to radiation from the flames circulating with great turbulence above them. Since the newly-introduced materials are poor conductors of heat, the heat exchange is poor, which appreciably slows the melting process.

The present invention especially relates to increasing the efficiency and output of glass melting installations, and provides means whereby a glass melting furnace may be operated continuously and uniformly at full capacity or beyond, if desired. Apparatus is provided for preheating the thoroughly-mixed, glass-forming ingredients before the same are supplied to the melting furnace, and preferably utilizing the heat of the waste gases from the melting furnace in such preheating of the glass mixture, and causing continuous passage of the glass mixture by gravity through the preheater for subsequent delivery to the melting furnace.

This invention comprises an improved process and means for practicing the process to accomplish the aforesaid objects, and in the provision of an improved arrangement of apparatus for preheating the glass batch mixture and for utilizing waste gases from glass melting furnaces, or preheated hot air from such furnaces, as more fully set forth in the following specification, and as particularly pointed out in the appended claims.

The provision of the preheater for the glass-making mixture enables the utilization, for heating the same, of the heat in the waste gases from the melting furnace which otherwise would go to waste up the stack. While the use of hot waste gases is preferred to operate the preheater, preheated air from the furnace heat-recovery "checkers" area which is used for combustion, or a supplemental heat source such as an oil or gas burner, alone or in combination, may also be used to heat the air or waste gases for operating the preheater. Also, atmospheric air may be heated to operate the batch preheater. The provision of the preheater, continuously delivering glass batch mixture at a proper predetermined elevated temperature, to a melting furnace, which is used with either continuous or batch processes, permits more uniform operation of the furnace with a significant increase in efficiency of operation and in the output of the furnace.

2. Description of Prior Art

There is a considerable number of earlier-issued U.S. patents which deal with initially preheating the glass batch mixture prior to its delivery into the glass furnace. U.S. Pat. No. 3,607,170 to Malesak discloses method and apparatus in which the glass mixture is preheated in a non-oxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the quantity and rate of flow of the fumes in the preheating zone are in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace and transferred by heat pipes to an enclosure in which incoming glass batch materials are preheated prior to being fed to a furnace for melting. The heat pipes contain metallic sodium as the working fluid.

U.S. Pat. No. 3,788,832 to Nesbitt et al, and U.S. Pat. No. 3,880,639 to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other than exhausted effluent so that there is no unpredictable relationship between varying amounts of waste heat and the amount of heat provided for preheating unmelted batch materials.

A considerable number of other patents relates to the direct heat exchange between incoming batch materials and exhaust gases from a glass melting furnace. These patents are: U.S. Pat. Nos. 3,607,190 to Penberthy, 4,026,691—Lovett, 3,526,492—Motsch, 3,350,213—Peyches, 1,543,770—Hilbert, 3,753,743—Kukuda, 1,610,377—Hitner, and 4,099,953—Rondeaux. Many techniques have been disclosed in the patent literature for direct and indirect heat exchange between hot exhaust gases from a glass melting furnace and incoming batch materials; however, none is capable of achieving the results attainable by the present invention.

DESCRIPTION OF THE PREFERRED EMODIMENT

Figure 1:
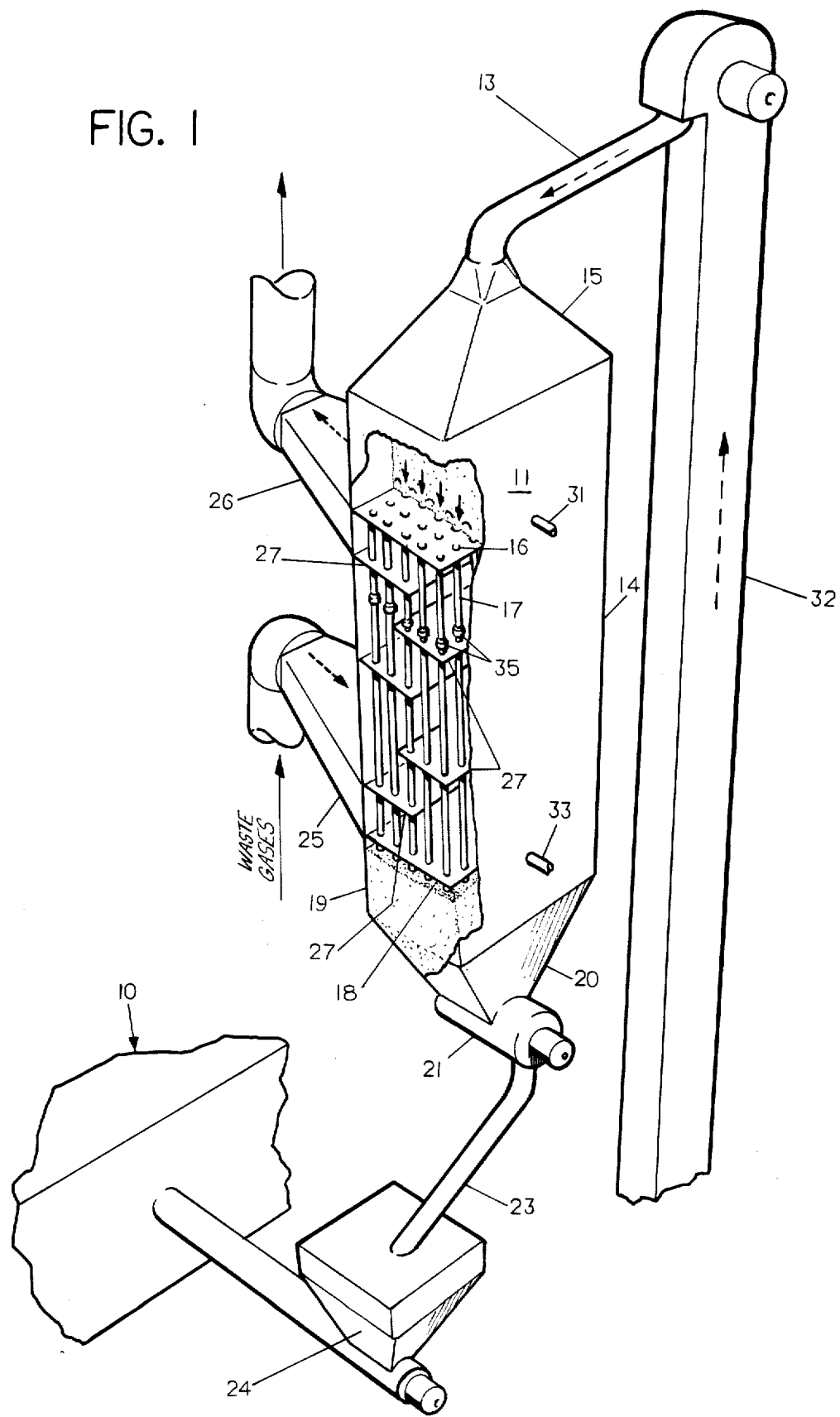
FIG. 1 is a perspective view partially broken away of the glass batch preheater apparatus for practicing the present invention.

Referring to the drawings, a glass melting furnace 10 of the regenerative type having a bottom of fire brick, whereon the melt of glass forming ingredients is deposited, is indicated schematically in FIG. 1. Gas and air are normally mixed and burned in the furnace above the glass forming materials, and the resulting heat melts the mixed materials to a mass of molten glass, which is delivered or worked from one end following refining. The regenerative or heat-accumulating chambers or passageways are normally located beneath the furnace melting chamber.

The air is usually passed through the regenerative passages beneath the furnace bottom for preheating and through side ports which lead into the furnace melting chamber where it is mixed with fuel which is burned to melt the glass forming materials. The hot waste gases are then passed through opposite side ports and then through the regenerative passages for heat recovery, and then to flue ducts and a discharge stack. After a limited period of operation in this manner, the path of travel of the incoming gas and air is switched, by suitable dampers and timers, so that the air then enters the melting chamber from opposite ports, the hot waste gases then passing off through opposite flue passages and ducts to the stack. By the alternate use of the regenerative passage for incoming combusion air and outgoing hot waste gases, the incoming air is preheated by the bricks of the regenerative passages which have been heated by the escaping flue gases which previously passed therethrough. All of the foregoing description pertains to well known glass furnace construction and is merely set forth by way of example. The waste gases from the furnace, the preheated combustion air from the furnace, or supplementary atmospheric air which has been suitably preheated, may alternately be employed to operate the batch preheater.

In accordance with a preferred embodiment of the present invention, a preheater 11 is mounted adjacent to the batch feeding end of the glass furnace at an elevation higher than the normal elevation of the furnace batch chargers. The glass forming ingredients in suitably intermixed condition are delivered to the top of the preheater 11 by any suitable means such as a vertical elevator 32. The vertical elevator may consist of any endless chain or bucket-type arrangement of standard construction, capable of taking the glass forming mixture from a pile or hopper and delivering it into a chute 13 through which it passes into the top of the preheater 11. The glass forming mixture comprises the normal intermixed batch constituents and may or may not contain broken cullet for forming the glass melt. The cullet, when present, normally has a size ranging from less than one-half (½) inch U.S. mesh size, the smaller size being preferred for passage through the preheater to prevent bridging within or over the tubes.

The preheater typically comprises a vertical chamber 14 having a rectangular cross-section with a frusto-pyramidal top cover 15. The main mass of glass batch is delivered through a chute leading into the bottom area of vertical elevator 32 for delivery to the top of preheater 11. Between the enclosed top cover and the main body portion of the preheater is located an interior horizontal upper plate 16 into which a plurality of open-ended tubes 17 are headed at their upper ends. The tubes are mounted in spaced-apart array in parallel, vertical alignment for passage of the glass batch therethrough. The space between the upper ends of adjacent tubes is covered with a bulbous nose member 30 to ensure free flow of the glass batch uniformly into each tube. Air pressure is introduced into each nose member, the latter having one or more exit openings to allow the pressurized air to escape therefrom. A single inlet pipe 31 for the pressurized air can be used to interconnect with each of the nose members. One nose member 30 is located between each array of upper ends of two adjacent rows of tubes. The gaseous fluid serves to drive the moisture and water vapor contained in the glass batch downwardly with the flow of batch to avoid tube pluggage due to condensation.

The tubes 17 preferably have about a 4 inch outside diameter and extend throughout the central major portion of the preheater to an interior horizontal lower plate 18 into which they are similarly headed. Thus, the central portion of the preheater comprises a shell and tube arrangement. Tubes having about the stated dimension are capable of handling batch, including cullet, while tubes of about 2 inch internal diameter are able to handle cullet-free batch. The lower open ends of the tubes extend a short distance below lower plate 18 to allow free discharge of the glass batch therefrom. The space around the downwardly-projectin tube ends normally remains open above the collected batch emitting from the tubes. The number of tubes and dimensions of the preheater will depend upon the size of the glass melting furnace with which it is employed, and the desired conditions of use. The tubes are mounted on about 6 to 8 inch centers where 4 inch outside diameter tubes are employed, the corner tubes usually being omitted where the preheater has a rectangular or square horizontal cross-section. The tubes are preferably comprised of carbon or stainless steel for long-term use without rusting or corrosion, and are normally equispaced for optimum particulate batch flow.

The lower region of the preheater comprises a frusto-pyramidal bottom hopper 20 into which the open-ended tubes 17 deliver the heated glass batch. The bottom hopper terminates at its lower extremity into a screw-driven batch removal chamber 21 which interconnects with a valve member 22. The valve member has an exit portion for directing the heated glass batch through a chute 23 to a batch charger 24. The batch charger is capable of delivering the heated glass batch into the furnace 10 through a screw-driven feed member or other means as known in the art.

Immediately above the bottom interior header member 18 of the preheater, an incoming waste gas duct 25 is mounted for delivering hot waste gases into a lower region of the preheater. The duct is designed to open out into a relatively-flat, wide duct inlet having a width comparable to the preheater for introducing the hot gases across its full width.

Immediately below the upper interior header member 16 of the preheater, an outgoing waste gas duct 26 for removing hot waste gases from an upper region is mounted. The duct consists of a relatively-flat, wide duct outlet having a width comparable to the preheater for removing the hot gases across its full width.

A plurality of flat baffle plates 27 is mounted in spaced-apart, staggered relation within the preheater between the upper and lower interior header plates 16 and 18. The baffle plates 27 have openings therein through which the tubes 17 extend between their upper and lower extremities. The baffle plates are able to direct the upwardly coursing hot waste gases into a circuitous path to provide turbulence to the gases and thereby improve heat transfer to the tubes and the glass batch moving downwardly by gravity therewithin.

The batch mixture passes gradually and continuously through the preheater by gravity from top to bottom. The moisture normally found in the glass batch in an amount ranging from 0.1 to 2 percent by weight is vaporized due to the batch heating. The pressurized air introduced into the area over the tube upper ends serves to force the moisture downwardly along with batch flow. Thus, its condensation or collection in the upper cooler areas of the tubes is prevented. The batch is then delivered, uniformly heated, moisture-free and well mixed, from the bottom hopper region of the preheater to the glass batch charger 24 of the furnace. The glass batch is thus advanced slowly and continuously downwardly to the furnace area for melting.

The glass batch in the preheater is indirectly heated by the hot waste gases which are taken from the furnace prior to their arrival at the stack. As shown, the hot gases enter the bottom region of the preheater near the lower end of the tubes and immediately above lower plate 18, the gases then passing in a serpentine path around the baffle plates 27 to the top of the preheater at the underside of upper plate 16, and then escaping from the preheater through outgoing duct 26. Inlet and outlet ducts 25 and 26 may be provided with dampers so that the flow of hot gases through the preheater may be accurately controlled. The gases passing in countercurrent flow to the descending glass forming materials, within the tubes, move between and around the tubes heating the same, and the contained glass batch indirectly. Further, the hottest gases thus act upon the hottest portion of the glass forming constituents in the lower area of the preheater, adding a further increment to their heat before passing into the melting furnace. As stated hereabove, the hot gas stream may be comprised of waste gases from the furnace heating zone, or preheated combustion air from the furnace checkers area, or prehated outside air which has been supplementally heated prior to delivery to the batch preheater.

By proper design of the upper and lower hopper sections of the preheater, such areas having generally frusto-pyramidal shapes, relatively-uniform and smooth flow of the batch materials by gravity through the entire vertical height of the preheater is attained. Thus, flow rates of the batch through all of the heat exchanger tubes, to maintain the same virtually-full at all times, is obtained for uniform amounts of preheating. The preferred form of construction of the preheater is having a straight section with rounded corners at an upper region above the tubes, and a wedge-shaped hopper with rounded corners at the bottom at the tube lower ends for continuous movement of the hot, dry batch. A sufficient head is thereby maintained over the tubes to assure such gravity flow, along with a suitable feeder unit to remove preheated material from the bottom of the hopper.

A positive gas pressure, preferably using air, is introduced into an upper region of the preheater through the inlet pipe 31 leading from a source of pressurized gaseous fluid. The increased air pressure in the upper region serves to force the contained moisture in the glass batch downwardly during gravity flow of the batch to prevent its collection and condensation within an upper region of the tubes. Such condensation can cause a wetting of the batch and pluggage of the tubes, thereby causing either a shutdown or very inefficient operation of the preheater. The pressurized air serves to drive the moisture within the batch downwardly in the tubes to the lower region of the preheater from which area it can be expelled. At least one vent pipe or tube 33 is mounted within the sidewall of the lower region of the preheater for venting the moisture and water vapor to the atmosphere.

Figures 2, 3:
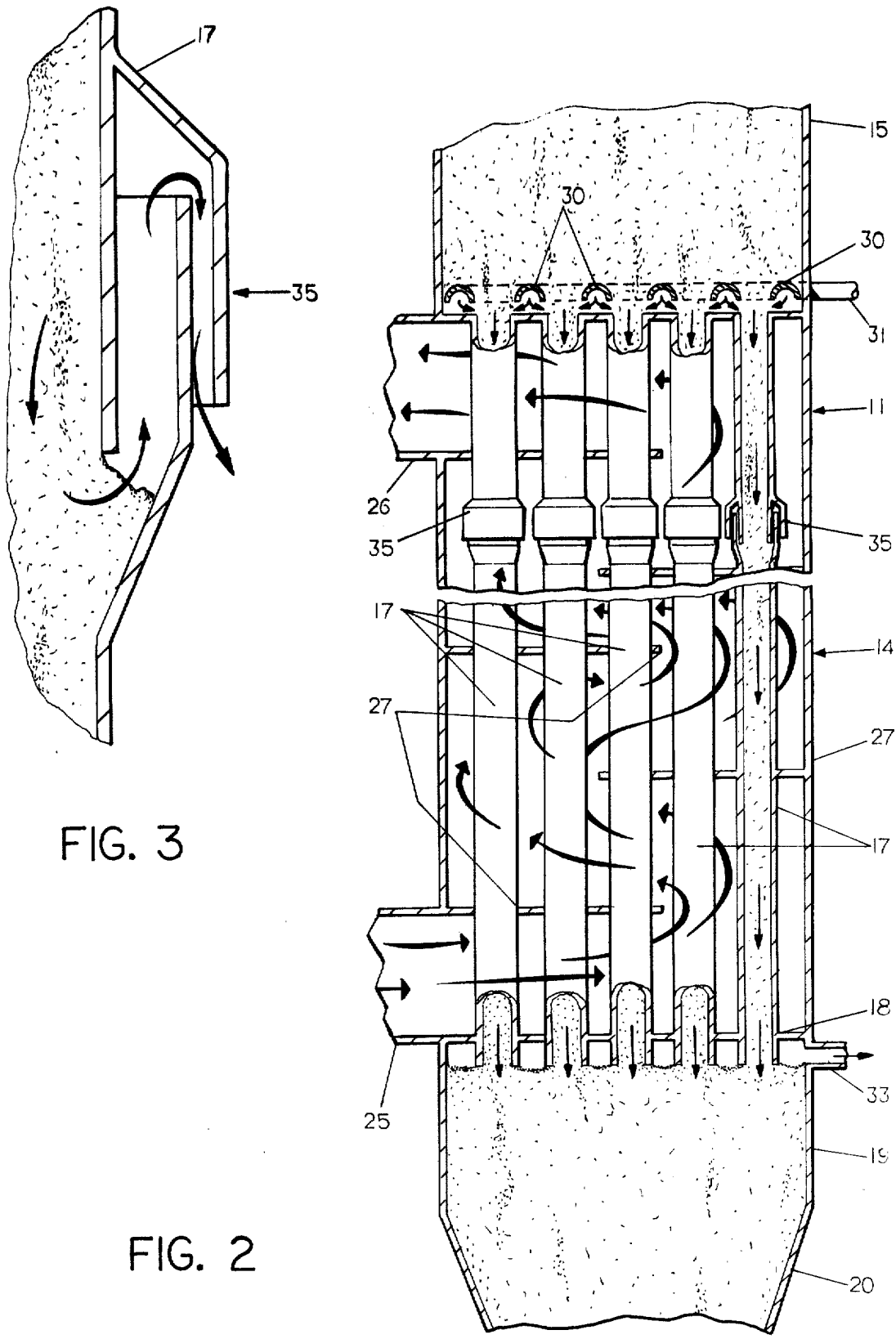
FIG. 2 is an enlarged fragmentary vertical sectional view of the preheater apparatus as shown in FIG. 1.
FIG. 3 is a further enlarged vertical sectional view of one portion of the slip joint connection of one tube of the preheater apparatus.
Figure 4:
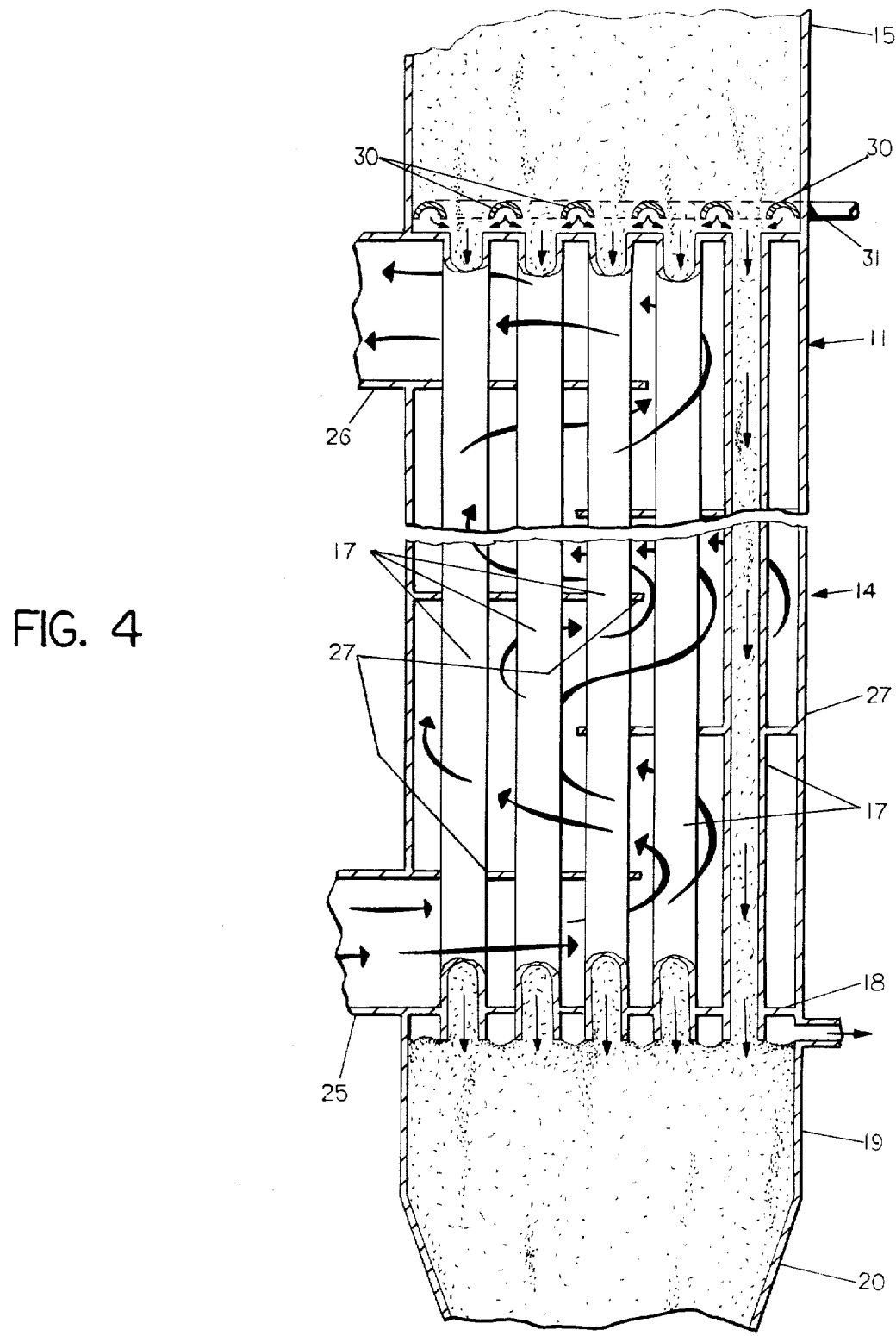
FIG. 4 is an enlarged fragmentary vertical sectional view of another embodiment of the preheater apparatus shown in FIG. 2

As shown in FIG. 2, each of the tubes 17 has a slip joint 35 at an upper region through which the moisture and water vapor can escape from the batch into the hot gas chamber of the preheater. The slip joints are preferably located in the upper quartile of tube length for optimum removal of a major portion of the moisture. The vent pipe 33 located in the preheater sidewall adjacent the tube lower ends permits the escape of additional moisture driven by the super-atmospheric gas pressure in the tubes. FIG. 3 shows an enlarged slip joint 35 to permit moisture release while allowing the batch to smoothly flow downwardly. FIG. 4 shows the tubes 17 being fully continuous without such slip joints for venting all of the moisture at the lower ends of the tubes.

The gas pressure in the upper region of the preheater is preferably maintained within a range of from 0.5 to 4.0 psi. Such pressure is adequate to prevent water and moisture condensation in the batch in the preheater tubes. Air is the preferred gasesous fluid, although nitrogen may also be used.

Through proper and thorough mixing of the newly-incoming cold batch fraction, uniform and continuous operation of the preheater apparatus can be practiced. This can be accomplished when the temperature conditions, and the flow of gases and batch material, are properly adjusted. Such uniform operation permits the maintenance of substantially-constant conditions within the preheater for delivering significantly-hotter glass batch to the furnace, greatly increasing the furnace efficiency.

The temperature of the stack gases entering the preheater will vary with furnace conditions, of course; however, they will normally be from 900° F. to 1100° F. and will frequently average about 1000° F. for substantial periods. The gases leaving the preheater will range from about 400° F. to 600° F., averaging about 500° F.

Obviously, additional heating means for the preheater may be provided, if desired, although the furnace waste gases are usually fully adequate for most economical operation. The waste gases, or hot air, normally enter the preheater at a temperature ranging from about 900° F. to 1100° F., after leaving the furnace combustion or checkers area. As stated, preheated combustion air which has passed through the furnace heat-recovery area can also be used to heat the batch in the preheater, or a separate supplemental heat source, such as a burner, may be used.

The glass batch mixture usually enters the top of the preheater at about ambient temperature and leaves the preheater at the valve member 22 having a temperature ranging from about 800° F. to 1000° F. Such temperatures are possible with a glass furnace which is capable of manufacturing about 100 to 300 tons per day of product.

The present invention is capable of continuous operation when downward movement of the glass batch in the cooler upper region of the preheater is supplemented with positive air pressure which is super-atmospheric. When the pressure on the batch in such region is allowed to fall to or below atmospheric, the residual moisture within the batch is able to condense within the tubes, and within the top cover member 15 of the preheater, causing pluggage of some of the tubes and bridging of the noramally-flowable mass. Such pluggage prevents optimum operation of the preheater and cannot be tolerated in long-term operation. By keeping all interior surfaces of the preheater contacted by the cooler batch above atmospheric pressure, the water contained in the batch is driven downwardly and batch adherance to such contacted surfaces can be prevented and smooth flow maintained.

The present invention is not limited to the interaction of one preheater to one melting furnace, the former being connected with hot gases leading to one stack. If desired, one preheater may be connected to serve a number of melting furnaces, or a number of preheaters may be associated with one furnace, and the waste gases emitting therefrom.

Various modifications may be resorted to within the spirit and scope of the appended claims.

We claim:

1. The process of preheating glass batch prior to its delivery to a glass melting furnace comprising the steps of introducing the fully-intermixed glass batch constituents into the upper region of a tubular heat exchanger, allowing the glass batch to flow downwardly by gravity through a plurality of open-ended tubes of said heat exchanger, passing hot gases upwardly through said heat exchanger around said open-ended tubes to heat the glass batch contained therein by countercurrent indirect heat transfer, increasing the internal pressure within an upper region of said heat exchanger by a gaseous fluid to thereby force the contained moisture downwardly, venting the contained moisture from within said glass batch exteriorly of said heat exchanger at a lower region thereof, and delivering the said heated glass batch from the bottom of said heat exchanger into the glass melting furnace.

2. The process in accordance with claim 1, wherein hot gases from said glass melting furnace are directed upwardly in a circuitous countercurrent path around said open-ended tubes by a series of spaced-apart baffles to achieve greater indirect heat transfer.

3. The process in accordance with claim 1, including the step of maintaining the glass batch within the open-ended tubes of said heat exchanger above the boiling point temperature of the residual moisture in said glass batch.

4. The process in accordance with claim 1, wherein the said glass batch is heated to a temperature ranging from about 800° to 1000° F. prior to delivery to said glass melting furnace.

5. The process in accordance with claim 1, wherein the said glass batch is passed through the open-ended vertical tubes of said heat exchanger having uniform dimensions of about 4 inch internal diameter.

6. The process in accordance with claim 1, wherein the internal pressure within the upper region of said heat exchange is maintained by air at a pressure ranging from about 0.5 to 4.0 psi.

7. The process in accordance with claim 1, wherein the hot waste gases from the furnace are passed upwardly through the said heat exchanger.

8. The process in accordance with claim 1, wherein the preheated combustion air from the furnace is passed upwardly through the said heat exchanger.

9. The process in accordance with claim 1, wherein the said vertical tubes have slip joints at an upper region thereof, and venting the moisture from the glass batch contained therein at said slip joints.

10. The process in accordance with claim 1, wherein the said vertical tubes are continuous and uninterrupted and venting the moisture from the glass batch contained therein at an area of the preheater adjacent the lower ends of said tubes.

11. Combined apparatus for preheating glass furnace batch comprising an elongated vertically-mounted heat exchanger having a plurality of open-ended tubes extending throughout a major central portion of its height, means for delivering glass batch in fully intermixed condition to an upper region of said heat exchanger for its passage by gravity through said open-ended tubes, means for introducing hot gases from said glass furnace into a lower region of said heat exchanger to circulate upwardly between the said open-ended tubes, baffle means mounted around said tubes to direct said hot gases in a circuitous path around said tubes and out of contact with said glass batch for indirect heat transfer, and means for introducing a gaseous fluid at superatmospheric pressure into the upper region of said heat exchanger to force the contained moisture downwardly, venting means located adjacent the lower end of said open-ended tubes to separate the contained moisture from said glass batch, and means for delivering the said glass batch to said glass furnace in essentially moisture-free preheated condition.

12. Combined apparatus in accordance with claim 11, wherein said means for introducing said hot gases into a lower region of said heat exchanger comprises a hollow duct leading from the furnace combustion chamber to said heat exchanger.

13. Combined apparatus in accordance with claim 11, wherein said baffle means comprises a series of baffle plates extending in staggered spaced-apart horizontal relation as a vertical array within said heat exchanger mounted around said open-ended tubes.

14. Combined apparatus in accordance with claim 11, wherein said open-ended tubes have generally uniform length and a uniform internal diameter of not less than about 2 inches.

15. Combined apparatus in accordance with claim 11, wherein said elongated preheater has a rectangular cross-section and the open-ended tubes are equi-spaced in vertical array in a shell-and-tube arrangement for transporting said glass batch constituents downwardly by gravity.

16. Combined apparatus in accordance with claim 11, wherein said means for introducing a gaseous fluid at superatmospheric pressure into an upper region of said preheater comprises a source of pressurized air, and an inlet pipe connected to a plurality of outlet orifices between the open upper ends of said tubes.

17. In the manufacture of glass, combined apparatus for preheating glass batch constituents comprising a glass melting furnace, a hollow duct for conveying hot gases therefrom, an elongated preheater for the glass batch constituents mounted vertically adjacent said glass melting furnace at an elevation higher than said furnace, open-ended vertical tubes extending through the major central portion of said preheater for conveyance of pulverous glass batch constituents therethrough by gravity, said hollow duct being connected to a lower region of said preheater for introducing the hot gases thereinto for passage upwardly around said tubes, baffle means mounted transversely of said tubes for directing said hot gases therearound in a circuitous countercurrent path for indirect heat transfer from said hot gases to said glass batch constituents, means for introducing a gaseous fluid at super-atmospheric pressure into an upper region of said preheater above said tubes to force the contained moisture within said glass batch downwardly through said tubes, venting means located adjacent the lower end of said tubes to eliminate the said contained moisture from said glass batch, and means for delivering the essentially moisture-free preheated glass batch into said glass melting furnace.

18. Combined apparatus in accordance with claim 17, wherein said baffle means comprises a plurality of flat plates extending in staggered spaced-apart essentially horizontal relation within said preheater around said open-ended tubes to provide a serpentine countercurrent flow of the hot gases.

19. Combined apparatus in accordance with claim 17, wherein said open-ended tubes have generally uniform length and a uniform internal diameter of not less than about 2 inches.

20. Combined apparatus in accordance with claim 17, wherein said elongated preheater has a rectangular cross-section and the open-ended tubes are equi-spaced in vertical array in a shell-and-tube arrangement for transporting said glass batch constituents downwardly by gravity.

21. Combined apparatus in accordance with claim 17, wherein said venting means comprises at least one vent pipe extending exteriorly of said preheater from an area adjacent the lower ends of said open-ended tubes.

22. Combined apparatus in accordance with claim 17, wherein said means for introducing a gaseous fluid comprises an inlet pipe and a source of pressurized air connected thereto.

23. Combined apparatus in accordance with claim 17, wherein said hot gases are hot waste gases conveyed from the combustion chamber of said glass melting furnace by said hollow duct into a lower region of said preheater.

24. A process of heating a particulate material such as glass batch, individual glass batch constituents, glass cullet, mixtures thereof, and the like, which contain a volatile condensible constituent, comprising the steps of introducing the particulate material into the upper region of an enclosed tubular heat exchanger, allowing the particulate material to flow downwardly by gravity through a plurality of open-ended tubes of said heat exchanger, passing hot gases upwardly through said heat exchanger around the exterior of said open-ended tubes to heat the particulate material contained therein by countercurrent indirect heat transfer, increasing the internal pressure within an upper region of said heat exchanger by a gaseous fluid to thereby force the contained volatile constituent downwardly, venting the volatile constituent from within the particulate material exteriorly of said heat exchanger at a lower region thereof, and delivering the said particulate material from the bottom of said heat exchanger in heated condition essentially free of said volatile condensible constituent.

25. The process in accordance with claim 24, wherein pressurized air is employed to maintain super-atmospheric pressure over the particulate material contained in said open-ended tubes.

26. The process in accordance with claim 24, wherein the hot gases are directed upwardly in a circuitous path around said open-ended tubes by a series of spaced-apart baffles to achieve greater indirect heat transfer.

27. The process in accordance with claim 24, wherein the internal pressure within the upper region of said heat exchanger is maintained by pressurized air at a pressure greater than about 0.5 psi over the particulate material contained in said open-ended tubes.

28. The process in accordance with claim 24, including the step of connecting at least one pressurized air line to an upper region of said heat exchanger above said open-ended tubes to force the contained volatile constituent downwardly from said particulate material.

29. The process in accordance with claim 24, including the step of maintaining a continuous super-atmospheric air pressure of about 0.5 to 2.0 psi over the said particulate material for the volatile constituent released during heating to remain in vapor form.

30. A heat exchanger for heating a particulate material such as glass batch, individual glass batch constituents, glass cullet, mixtures thereof, and the like, which contain a volatile condensible constituent, comprising an elongated vertically-mounted hollow enclosed chamber having a plurality of open-ended hollow tubes extending throughout a major portion of its height, means for delivering the particulate material to an upper region of said heat exchanger for its passage by gravity through said open-ended hollow tubes, means for introducing hot gases into a lower region of said heat exchanger to circulate upwardly between the said open-ended tubes, baffle means mounted around said tubes and out of contact with said particulate material for indirect heat transfer, means for creating super-atmospheric pressure within an upper region of said heat exchanger to force the contained volatile constituent downwardly, means for venting the volatile constituent from within the particulate material exteriorly of said heat exchanger at a lower region thereof, and means for delivering said particulate material at a lower region of said heat exchanger in heated condition essentially free of said volatile condensible constituent.

31. A heat exchanger in accordance with claim 30, wherein said means for introducing hot gases into a lower region of said heat exchanger comprises a hollow duct leading from a melting furnace to said heat exchanger.

32. A heat exchanger in accordance with claim 30, wherein said means for creating super-atmospheric pressure within an upper region of said heat exchanger comprises a pressurized air line connected to a source of pressurized air.

33. A heat exchanger in accordance with claim 30, wherein said baffle means comprises a series of baffle plates extending in staggered spaced-apart horizontal relation as a vertical array within said heat exchanger mounted around said open-ended tubes.

34. A heat exchanger in accordance with claim 30, wherein said open-ended hollow tubes have generally uniform length and a uniform internal diameter of not less than about two inches.

35. A heat exchanger in accordance with claim 30, wherein said elongated hollow enclosed chamber has a rectangular cross-section and the open-ended tubes are disposed in equispaced vertical array in a shell-and-tube arangement for transporting said particulate material continuously downwardly by gravity.

* * * * *